(12) United States Patent
Halasa et al.

(10) Patent No.: US 6,359,088 B1
(45) Date of Patent: Mar. 19, 2002

(54) CALCIUM-BASED CATALYST SYSTEM

(75) Inventors: Adel Farhan Halasa, Bath; Wen-Liang Hsu, Cuyahoga Falls; John Robert Zuppo, III, Akron, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/389,507

(22) Filed: Sep. 3, 1999

Related U.S. Application Data

(60) Provisional application No. 60/102,706, filed on Oct. 1, 1998.

(51) Int. Cl.[7] ................................................ C08F 8/00
(52) U.S. Cl. ..................... 526/175; 525/332.3; 526/339; 526/340
(58) Field of Search ................................ 526/175, 339, 526/340

(56) References Cited

U.S. PATENT DOCUMENTS

| | | | |
|---|---|---|---|
| 3,674,760 A | | 7/1972 | Halasa ....................... 260/83.7 |
| 4,933,401 A | * | 6/1990 | Hattori et al. ............... 526/175 |
| 5,100,965 A | | 3/1992 | Hsu et al. .................... 525/249 |
| 5,284,927 A | | 2/1994 | Hsu et al. .................... 526/174 |
| 5,534,592 A | | 7/1996 | Halasa et al. ................ 525/236 |
| 6,103,842 A | * | 8/2000 | Halasa et al. ................ 526/175 |

FOREIGN PATENT DOCUMENTS

EP 877034 A1 11/1998

OTHER PUBLICATIONS

Database Chemabs "Online", Chemical Abstracts Service, Columbus, Ohio US, Data base Accession No. 76:155173 CA XP002128046.

* cited by examiner

Primary Examiner—Bernard Lipman
(74) Attorney, Agent, or Firm—Alvin T. Rockhill

(57) ABSTRACT

The process and catalyst system of this invention can be utilized to synthesize a highly random styrene-butadiene rubber having a high trans content by solution polymerization. The styrene-butadiene rubber made by the process of this invention can be utilized in tire tread rubbers that exhibit improved wear characteristics. This invention more specifically reveals a catalyst system for use in isothermal polymerizations which consists essentially of (a) an organolithium compound, (b) a calcium alkoxide and (c) a lithium alkoxide. The subject invention further discloses a process for synthesizing a random styrene-butadiene rubber having a low vinyl content by a process which comprises copolymerizing styrene and 1,3-butadiene under isothermal conditions in an organic solvent in the presence of a catalyst system which consists essentially of (a) an organolithium compound, (b) a calcium alkoxide and (c) a lithium alkoxide. An amine can also be added to the catalyst system to increase the molecular weight (Mooney viscosity) of the rubber.

15 Claims, No Drawings

CALCIUM-BASED CATALYST SYSTEM

This application claims the benefit of U.S. Provisional Application No. 60/102,706 filed Oct. 1, 1998.

BACKGROUND OF THE INVENTION

It is highly desirable for pneumatic tires to have good wet skid resistance, low rolling resistance and good wear characteristics. It has traditionally been very difficult to improve the wear characteristics of a tire without sacrificing its wet skid resistance and traction characteristics. These properties depend, to a great extent, on the dynamic viscoelastic properties of the rubbers utilized in making the tire.

In order to reduce the rolling resistance and to improve the treadwear characteristics of tires, rubbers having a high rebound have traditionally been utilized in making tire tread rubber compounds. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads. For instance, various mixtures of styrene-butadiene rubber and polybutadiene rubber are commonly used as a rubbery material for automobile tire treads.

It is conventionally believed to be desirable for styrene-butadiene rubber which is utilized in tire tread compounds to have a high level of vinyl content (1,2-microstructure). It is also generally desirable for the repeat units which are derived from styrene to be randomly distributed throughout the polymer chains of the rubber. To achieve these objectives, styrene-butadiene rubbers are often synthesized by solution polymerization which is conducted in the presence of one or more modifying agents. Such modifying agents are well known in the art and are generally ethers, tertiary amines, chelating ethers or chelating amines. Tetrahydrofuran, tetramethylethylene diamine (TMEDA) and diethyl ether are some representative examples of modifying agents which are commonly utilized.

U.S. Pat. No. 5,284,927 discloses a process for preparing a rubbery terpolymer of styrene, isoprene and butadiene having multiple glass transition temperatures and having an excellent combination of properties for use in making tire treads which comprises terpolymerizing styrene, isoprene and 1,3-butadiene in an organic solvent at a temperature of no more than about 40° C. in the presence of (a) tripiperidino phosphine oxide, (b) an alkali metal alkoxide and (c) an organolithium compound.

U.S. Pat. No. 5,534,592 discloses a process for preparing high vinyl polybutadiene rubber which comprises polymerizing 1,3-butadiene monomer with a lithium initiator at a temperature which is within the range of about 5° C. to about 100° C. in the presence of a sodium alkoxide and a polar modifier, wherein the molar ratio of the sodium alkoxide to the polar modifier is within the range of about 0.1:1 to about 10:1; and wherein the molar ratio of the sodium alkoxide to the lithium initiator is within the range of about 0.01:1 to about 20:1.

U.S. Pat. No. 5,100,965 discloses a process for synthesizing a high trans polymer which comprises adding (a) at least one organolithium initiator, (b) an organoaluminum compound, (c) a barium alkoxide and (d) a lithium alkoxide to a polymerization medium which is comprised of an organic solvent and at least one conjugated diene monomer.

U.S. Pat. No. 5,100,965 further discloses that high trans polymers can be utilized to improve, the characteristics of tire tread rubber compounds. By utilizing high trans polymers in tire tread rubber compounds, tires having improved wear characteristics, tear resistance and low temperature performance can be made. Such high trans polymers include, trans-1,4-polybutadiene, trans styrene-isoprene-butadiene terpolymers, isoprene-butadiene copolymers and transstyrene-butadiene copolymers.

U.S. patent application Ser. No. 09/072,492, filed on May 4, 1998, U.S. Pat. No. 6,103,842 discloses a process for synthesizing a random styrene-butadiene rubber having a high trans content by a process which comprises copolymerizing styrene and 1,3-butadiene under isothermal conditions in an organic solvent in the presence of a catalyst system which consists essentially of (a) an organolithium compound, (b) a barium alkoxide and (c) a lithium alkoxide.

SUMMARY OF THE INVENTION

This invention is based upon the unexpected discovery that a catalyst system which consists of (a) an organometallic compound of a metal selected from the group consisting of lithium, potassium, magnesium, sodium, aluminum, zinc and tin, (b) a calcium compound and (c) a lithium alkoxide, will catalyze the copolymerization of 1,3-butadiene monomer and styrene monomer into a styrene-butadiene copolymer having a random distribution of repeat units which are derived from styrene. Styrene-butadiene rubber made utilizing the catalyst system and techniques of this invention is highly useful in the preparation of tire tread rubber compounds which exhibit improved wear characteristics.

It is preferred for the organometallic compound to be a lithium, potassium, magnesium or sodium compound. Organolithium compounds are normally most preferred. The calcium compound will typically be a calcium carboxylate, a calcium phenolate, a calcium amine, a calcium amide, a calcium halide, a calcium nitrate, a calcium sulfate, a calcium phosphate or a calcium alcoholate. It is preferred for the calcium compound to be soluble in the organic solvent used as the polymerization medium. It is accordingly preferred for the calcium compound to be a calcium alcoholate, a calcium carboxylate or a calcium phenolate. It is typically most preferred for the calcium compound to be a calcium alcoholate (a calcium alkoxide).

Calcium compounds, which are insoluble in the organic solvent used as the polymerization medium, can also be utilized. However, such calcium compounds will typically be preformed by mixing them with the other catalyst components in the presence of a conjugated diene monomer, such as 1,3-butadiene or isoprene.

The polymerizations of this invention are normally conducted in the absence of organoaluminum compounds. A highly preferred catalyst system for the copolymerization of 1,3-butadiene monomer and styrene monomer consists essentially of (a) an organolithium compound, (b) a calcium alkoxide and (c) a lithium alkoxide. The present invention accordingly specifically discloses a catalyst system which consists essentially of (a) an organolithium compound, (b) a calcium alkoxide and (c) a lithium alkoxide.

The subject invention further discloses a process for synthesizing a random styrene-butadiene rubber having a high trans content by a process which comprises copolymerizing styrene and 1,3-butadiene under isothermal conditions in an organic solvent in the presence of a catalyst system which consists essentially of (a) an organolithium compound, (b) a calcium alkoxide and (c) a lithium alkoxide.

The subject invention also reveals a process for synthesizing trans polybutadiene rubber having a vinyl content which is within the range of about 5 percent to about 15 percent by a process which comprises polymerizing 1,3-butadiene in an organic solvent in the presence of a catalyst system which consists essentially of (a) an organolithium compound, (b) a calcium alkoxide and (c) a lithium alkoxide.

The present invention further reveals a catalyst system which consists essentially of (a) an organometallic compound of a metal selected from the group consisting of lithium, potassium, magnesium, sodium, aluminum, zinc and tin, (b) a calcium compound and (c) a lithium alkoxide.

The subject invention further reveals a styrene-butadiene rubber which is particularly useful in tire tread compounds, said styrene-butadiene rubber being comprised of repeat units which are derived from about 3 weight percent to about 50 weight percent styrene and from about 50 weight percent to about 97 weight percent butadiene, wherein at least 98 percent of the repeat units derived from styrene are in blocks containing less than 5 repeat units, wherein at least 40 percent of the repeat units derived from styrene are in blocks containing only 1 repeat styrene unit, wherein said rubber has a trans content which is within the range of 50 percent to 80 percent, wherein the rubber has a cis content which is within the range of 10 percent to 45 percent, wherein the rubber has a vinyl content which is within the range of 5 percent to 20 percent and wherein there are no segments of at least 100 repeat units within the rubber which have a styrene content which differs from the total styrene content of the rubber by more than 10 percent.

DETAILED DESCRIPTION OF THE INVENTION

The polymerizations of the present invention will normally be carried out in a hydrocarbon solvent which can be one or more aromatic, paraffinic or cycloparaffinic compounds. These solvents will normally contain from 4 to 10 carbon atoms per molecule and will be liquid under the conditions of the polymerization. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, petroleum naphtha and the like, alone or in admixture.

In the solution polymerizations of this invention, there will normally be from 5 to 30 weight percent monomers in the polymerization medium. Such polymerization media are, of course, comprised of the organic solvent and monomers. In most cases, it will be preferred for the polymerization medium to contain from 10 to 25 weight percent monomers. It is generally more preferred for the polymerization medium to contain 15 to 20 weight percent monomers.

The solution styrene-butadiene rubbers made utilizing the catalyst system and technique of this invention are comprised of repeat units which are derived from 1,3-butadiene and styrene. These styrene-butadiene rubbers will typically contain from about 5 weight percent to about 50 weight percent styrene and from about 50 weight percent to about 95 weight percent 1,3-butadiene. However, in some cases, the amount of styrene included will be as low as about 3 weight percent. The styrene-butadiene rubber will more typically contain from about 10 weight percent to about 30 weight percent styrene and from about 70 weight percent to about 90 weight percent 1,3-butadiene. The styrene-butadiene rubber will preferably contain from about 15 weight percent to about 25 weight percent styrene and from about 75 weight percent to about 85 weight percent 1,3-butadiene. These styrene-butadiene rubbers typically have a melting point which is within the range of about −10° C. to about −20° C.

Styrene-butadiene copolymer resins containing from about 50 weight percent to about 95 weight percent styrene and from about 5 weight percent to about 50 weight percent 1,3-butadiene can also be synthesized utilizing the catalyst systems of this invention. Such copolymers having glass transition temperatures within the range of 7° C. to 70° C. can be used as toner resins.

In the styrene-butadiene rubbers of this invention, the distribution of repeat units derived from styrene and butadiene is essentially random. The term "random" as used herein means that less than 5 percent of the total quantity of repeat units derived from styrene are in blocks containing five or more styrene repeat units. In other words, more than 95 percent of the repeat units derived from styrene are in blocks containing less than five repeat units. A large quantity of repeat units derived from styrene will be in blocks containing only one styrene repeat unit. Such blocks containing one styrene repeat unit are bound on both sides by repeat units which are derived from 1,3-butadiene.

In styrene-butadiene rubbers containing less than about 30 weight percent bound styrene which are made with the catalyst system of this invention, less than 2 percent of the total quantity of repeat units derived from styrene are in blocks containing five or more styrene repeat units. In other words, more than 98 percent of the repeat units derived from styrene are in blocks containing less than five repeat units. In such styrene-butadiene rubbers, over 40 percent of repeat units derived from styrene will be in blocks containing only one styrene repeat unit, over 75 percent of the repeat units derived from styrene will be in blocks containing less than 3 repeat units and over 90 percent of the repeat units derived from styrene will be in blocks containing less than 4 repeat units.

In styrene-butadiene rubbers containing less than about 20 weight percent bound styrene which are made with the catalyst system of this invention, less than 1 percent of the total quantity of repeat units derived from styrene are in blocks containing 4 or more styrene repeat units. In other words, more than 99 percent of the repeat units derived from styrene are in blocks containing less than 4 repeat units. In such styrene-butadiene rubbers, over 60 percent of repeat units derived from styrene will be in blocks containing only one styrene repeat unit-and over 90 percent of the repeat units derived from styrene will be in blocks containing less than 3 repeat units.

The styrene-butadiene copolymers of this invention also have a consistent composition throughout their polymer chains. In other words, the styrene content of the polymer will be the same from the beginning to the end of the polymer chain. No segments of at least 100 repeat units within the polymer will have a styrene content which differs from the total styrene content of the polymer by more than 10 percent. Such styrene-butadiene copolymers will typically contain no segments having a length of at least 100 repeat units which have a styrene content which differs from the total styrene content of the polymer by more than about 5 percent.

The polymerizations of this invention are initiated by adding (a) an organometallic compound of a metal selected from the group consisting of lithium, potassium, magnesium, sodium, aluminum, zinc and tin, (b) a calcium compound and (c) a lithium alkoxide to a polymerization medium containing the monomers to be polymerized. The polymerizations of this invention are typically initiated by adding an organolithium compound, a calcium alkoxide and a lithium alkoxide to a polymerization medium containing the styrene and 1,3-butadiene monomers. Such polymerization can be carried out utilizing batch, semi-continuous or continuous techniques.

The organolithium compounds which can be employed in the process of this invention include the monofunctional and multifunctional initiator types known for polymerizing the conjugated diolefin monomers. The multifunctional organolithium initiators can be either specific organolithium compounds or can be multifunctional types which are not necessarily specific compounds but rather represent reproducible compositions of regulable functionality.

The choice of initiator can be governed by the degree of branching and the degree of elasticity desired for the polymer, the nature of the feedstock and the like. With regard to the feedstock employed as the source of conjugated diene, for example, the multifunctional initiator types generally are preferred when a low concentration diene stream is at least a portion of the feedstock, since some components present in the unpurified low concentration diene stream may tend to react with carbon lithium bonds to deactivate the activity of the organolithium compound, thus necessitating the presence of sufficient lithium functionality so as to override such effects.

The multifunctional organolithium compounds which can be used include those prepared by reacting an organomonolithium compounded with a multivinylphosphine or with a multivinylsilane, such a reaction preferably being conducted in an inert diluent such as a hydrocarbon or a mixture of a hydrocarbon and a polar organic compound. The reaction between the multivinylsilane or multivinylphosphine and the organomonolithium compound can result in a precipitate which can be solubilized, if desired, by adding a solubilizing monomer such as a conjugated diene or monovinyl aromatic compound, after reaction of the primary components. Alternatively, the reaction can be conducted in the presence of a minor amount of the solubilizing monomer. The relative amounts of the organomonolithium compound and the multivinylsilane or the multivinylphosphine preferably should be in the range of about 0.33 to 4 moles of organomonolithium compound per mole of vinyl groups present in the multivinylsilane or multivinylphosphine employed. It should be noted that such multifunctional initiators are commonly used as mixtures of compounds rather than as specific individual compounds. Exemplary organomonolithium compounds include ethyl lithium, isopropyl lithium, n-butyllithium, sec-butyllithium, tert-octyl lithium, n-eicosyl lithium, phenyl lithium, 2-naphthyllithium, 4-butylphenyllithium, 4-tolyllithium, 4-phenylbutyllithium, cyclohexyl lithium and the like.

Exemplary multivinylsilane compounds include tetravinylsilane, methyltrivinylsilane, diethyldivinylsilane, di-n-dodecyldivinylsilane, cyclohexyltrivinylsilane, phenyltrivinylsilane, benzyltrivinylsilane, (3-ethylcyclohexyl) (3-n-butylphenyl)divinylsilane and the like.

Exemplary multivinylphosphine compounds include trivinylphosphine, methyldivinylphosphine, dodecyldivinylphosphine, phenyldivinylphosphine, cyclooctyldivinylphosphine and the like.

Other multifunctional polymerization initiators can be prepared by utilizing an organomonolithium compound, further together with a multivinylaromatic compound and either a conjugated diene or monovinylaromatic compound or both. These ingredients can be charged initially, usually in the presence of a hydrocarbon or a mixture of a hydrocarbon and a polar organic compound as a diluent. Alternatively, a multifunctional polymerization initiator can be prepared in a two-step process by reacting the organomonolithium compound with a conjugated diene or monovinyl aromatic compound additive and then adding the multivinyl aromatic compound. Any of the conjugated dienes or monovinyl aromatic compounds described can be employed. The ratio of conjugated diene or monovinyl aromatic compound additive employed preferably should be in the range of about 2 to 15 moles of polymerizable compound per mole of organolithium compound. The amount of multivinylaromatic compound employed preferably should be in the range of about 0.05 to 2 moles per mole of organomonolithium compound.

Exemplary multivinyl aromatic compounds include 1,2-divinylbenzene, 1,3-divinylbenzene, 1,4-divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, m-diisopropenyl benzene, p-diisopropenyl benzene, 1,3-divinyl-4,5,8-tributylnaphthalene and the like. Divinyl aromatic hydrocarbons containing up to 18 carbon atoms per molecule are preferred, particularly divinylbenzene as either the ortho, meta or para isomer, and commercial divinylbenzene, which is a mixture of the three isomers, and other compounds such as the ethyl styrenes, also is quite satisfactory.

Other types of multifunctional lithium compounds can be employed such as those prepared by contacting a sec- or tert-organomonolithium compound with 1,3-butadiene, at a ratio of about 2 to 4 moles of the organomonolithium compound per mole of the 1,3-butadiene, in the absence of added polar material in this instance, with the contacting preferably being conducted in an inert hydrocarbon diluent, though contacting without the diluent can be employed, if desired.

Alternatively, specific organolithium compounds can be employed as initiators, if desired, in the preparation of polymers in accordance with the present invention. These can be represented by R(Li)x wherein R represents a hydrocarbyl radical containing from 1 to 20 carbon atoms, and wherein x is an integer of 1 to 4. Exemplary organolithium compounds are methyl lithium, isopropyl lithium, n-butyllithium, sec-butyllithium, tert-octyl lithium, n-decyl lithium, phenyl lithium, 1-naphthyllithium, 4-butylphenyllithium, p-tolyl lithium, 4-phenylbutyllithium, cyclohexyl lithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butane, 1,8-dilithio-3-decene, 1,2-dilithio-1,8-diphenyloctane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl and the like.

The calcium alkoxides which can be utilized typically have the structural formula:

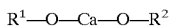

wherein $R^1$ and $R^2$ can be the same or different and represent alkyl groups (including cycloalkyl groups), aryl groups, alkaryl groups or arylalkyl groups. Some representative examples of suitable calcium alkoxides include calcium dimethoxide, calcium diethoxide, calcium diisopropoxide, calcium di-n-butoxide, calcium di-sec-butoxide, calcium di-t-butoxide, calcium di(1,1-dimethylpropoxide), calcium di(1,2-dimethylpropoxide), calcium di(1,1-dimethylbutoxide), calcium di(1,10-dimethylpentoxide), calcium di(2-ethylhexanoxide), calcium di(1-methylheptoxide), calcium diphenoxide, calcium di(p-methylphenoxide), calcium di(p-octylphenoxide), calcium di(p-nonylphenoxide), calcium di(p-dodecylphenoxide), calcium di(α-naphthoxide), calcium di(β-naphthoxide), calcium (o-methoxyphenoxide), calcium (o-methoxyphenoxide), calcium di(m-methoxyphenoxide), calcium di(p-methoxyphenoxide), calcium (o-ethoxyphenoxide), calcium (4-methoxy-1-naphthoxide) and the like. Cyclic compounds, such as calcium ditetrahydrofurfurylate, can also be utilized in the catalyst system.

Calcium alkoxides can be prepared using inexpensive starting materials using a relatively simple procedure. This is done by reacting calcium hydroxide, Ca(OH)$_2$, with an alcohol of the formula ROH at a temperature which is within the range of about 150° C. to about 250° C. This reaction can be depicted as follows:

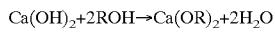

Ca(OH)$_2$+2ROH→Ca(OR)$_2$+2H$_2$O wherein R represents an alkyl group, an aryl group or an alkaryl group. R will preferably be a 2-ethylhexyl group, a nonylphenyl group, a dodecylphenyl group, a tetrahydrofurfuryl group or a furfuryl group. This reaction will preferably be conducted at a temperature which is within the range of about 175° C. to 200° C. with the alcohol acting as the solvent for the reaction. The reaction will normally be carried out at a temperature which is above the boiling point of the alcohol for a period of 2–3 hours. After the reaction has been completed, excess alcohol is removed by distillation under vacuum or evaporation. Then, the calcium alkoxide is recovered by dissolving it in a suitable organic solvent; such as, ethyl benzene, toluene or xylene.

The lithium alkoxide compounds which can be utilized have the structural formula:

LiOR wherein R represents an alkyl group, an aryl group, an alkaryl group, an arylalkyl group or a hydrocarbon group containing at least one hetero atom selected from the group consisting of oxygen atoms and nitrogen atoms. The lithium alkoxide can be synthesized by reacting an organolithium compound, metallic lithium or lithium hydride with an alcohol. The organolithium compound, metallic or lithium hydride can be reacted with the alcohol at a molar ratio of 0.5:1 to 3:2. It is preferred for the alcohol to be reacted with an equal molar amount of the organolithium compound, metallic lithium or lithium hydride. Some representative examples of alcohols which can be utilized in preparing the lithium alkoxide include methanol, ethanol, n-propyl alcohol, isopropyl alcohol, t-butanol, sec-butanol, cyclohexanol, octanol, 2-ethylhexanol, p-cresol, m-cresol, nonyl phenol, hexylphenol, tetrahydrofurfuryl alcohol, furfuryl alcohol, 3-methyltetrahydrofurfuryl alcohol, oligomer of tetrahydrofurfuryl alcohol, ethylene glycol monophenyl ether, ethylene glycol monobutyl ether, N,N-dimethylethanolamine, N,N-diethylethanolamine, N,N-dibutylethanolamine, N,N-diphenylethanolamine, N-methyldiethanolamine, N-ethyldiethanolamine, N-butyldiethanolamine, N-phenyldiethanolamine, N,N-dimethylpropanolamine, N,N-dibutylpropanolamine, N-methyldipropanolamine, N-ethyldipropanolamine, 1-(2-hydroxyethyl)pyrrolidine, 2-methyl-1-(2-hydroxyethyl) pyrrolidine, 1-piperidineethanol, 2-phenyl-1-piperidineethanol, 2-ethyl-1-piperidinepropanol, N-β-hydroxyethylmorpholine, 2-ethyl-N-β-hydroxyethylmorpholine, 1-piperazineethanol, 1-piperazinepropanol, N,N'bis(β-hydroxyethyl)piperazine, N,N'-bis(Y-hydroxypropyl)-piperazine, 2-(β-hydroxyethyl) pyridine, 2-(γ-hydroxypropyl)pyridine and the like.

The molar ratio of the lithium alkoxide to the calcium alkoxide will be within the range of about 1:1 to about 20:1 and will preferably be within the range of 5:2 to 10:1. The molar ratio of the lithium alkoxide to the calcium alkoxide will most preferably be within the range of about 3:1 to about 5:1. The molar ratio of the alkyl lithium compound to the calcium alkoxide will be within the range of about 1:1 to about 6:1 and will preferably be within the range of 3:2 to 4:1. The molar ratio of the alkyl lithium compound to the calcium alkoxide will most preferably be within the range of 2:1 to 3:1.

The organolithium compound will normally be present in the polymerization medium in an amount which is within the range of about 0.01 to 1 phm (parts by 100 parts by weight of monomer). In most cases, from 0.01 phm to 0.1 phm of the organolithium compound will be utilized with it being preferred to utilize from 0.025 phm to 0.07 phm of the organolithium compound in the polymerization medium.

The polymerization temperature utilized can vary over a broad temperature range of from about 20° C. to about 180° C. In most cases, a temperature within the range of about 40° C. to about 120° C. will be utilized. It is typically most preferred for the polymerization temperature to be within the range of about 70° C. to about 100° C. The pressure used will normally be sufficient to maintain a substantially liquid phase under the conditions of the polymerization reaction.

Polar modifiers can be used to modify the microstructure of the rubbery polymer being synthesized. Ethers and amines which act as Lewis bases are representative examples of polar modifiers that can be utilized. Some specific examples of typical polar modifiers include diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine (TMEDA), N-methyl morpholine, N-ethyl morpholine, N-phenyl morpholine and the like. Dipiperidinoethane, dipyrrolidinoethane, tetramethylethylene diamine, diethylene glycol, dimethyl ether, TMEDA, tetrahydrofuran, piperidine, pyridine and hexamethylimine are representative of highly preferred modifiers. U.S. Pat. No. 4,022,959 describes the use of ethers and tertiary amines as polar modifiers in greater detail.

The polymerization is conducted for a length of time sufficient to permit substantially complete polymerization of monomers. In other words, the polymerization is normally carried out until high conversions are attained. The polymerization can then be terminated using a standard technique. The polymerization can be terminated with a conventional noncoupling type of terminator (such as, water, an acid and a lower alcohol) or with a coupling agent.

Coupling agents can be used in order to improve the cold flow characteristics of the rubber and rolling resistance of tires made therefrom. It also leads to better processability and other beneficial properties. A wide variety of compounds suitable for such purposes can be employed. Some representative examples of suitable coupling agents include: multivinylaromatic compounds, multiepoxides, multiisocyanates, multiimines, multialdehydes, multiketones, multihalides, multianhydrides, multiesters which are the esters of polyalcohols with monocarboxylic acids, and the diesters which are esters of monohydric alcohols with dicarboxylic acids and the like.

Examples of suitable multivinylaromatic compounds include divinylbenzene, 1,2,4-trivinylbenzene, 1,3-divinylnaphthalene, 1,8-divinylnaphthalene, 1,3,5-trivinylnaphthalene, 2,4-divinylbiphenyl and the like. The divinylaromatic hydrocarbons are preferred, particularly divinylbenzene in either its ortho, meta or para isomer. Commercial divinylbenzene which is a mixture of the three isomers and other compounds is quite satisfactory.

While any multiepoxide can be used, liquids are preferred since they are more readily handled and form a relatively small nucleus for the radial polymer. Especially preferred among the multiepoxides are the epoxidized hydrocarbon polymers such as epoxidized liquid polybutadienes and the epoxidized vegetable oils such as epoxidized soybean oil and epoxidized linseed oil. Other epoxy compounds, such as 1,2,5,6,9,10-triepoxydecane, also can be used.

Examples of suitable multiisocyanates include benzene-1,2,4-triisocyanate, naphthalene-1,2,5,7-tetraisocyanate and the like. Especially suitable is a commercially available product known as PAPI-1, a polyarylpolyisocyanate having an average of three isocyanate groups per molecule and an average molecular weight of about 380. Such a compound can be visualized as a series of isocyanate-substituted benzene rings joined through methylene linkages.

The multiimines, which are also known as multiaziridinyl compounds, preferably are those containing three or more aziridine rings per molecule. Examples of such compounds include the triaziridinyl phosphine oxides or sulfides such as tri(1-ariridinyl)phosphine oxide, tri(2-methyl-1-ariridinyl) phosphine oxide, tri(2-ethyl-3-decyl-1-ariridinyl)phosphine sulfide and the like.

The multialdehydes are represented by compounds such as 1,4,7-naphthalene tricarboxyaldehyde, 1,7,9-anthracene tricarboxyaldehyde, 1,1,5-pentane tricarboxyaldehyde and similar multialdehyde containing aliphatic and aromatic compounds. The multiketones can be represented by compounds such as 1,4,9,10-anthraceneterone, 2,3-diacetonylcyclohexanone and the like. Examples of the multianhydrides include pyromellitic dianhydride, styrene-maleic anhydride copolymers and the like. Examples of the multiesters include diethyladipate, triethyl citrate, 1,3,5-tricarbethoxybenzene and the like.

The preferred multihalides are silicon tetrahalides (such as silicon tetrachloride, silicon tetrabromide and silicon tetraiodide) and the trihalosilanes (such as trifluorosilane, trichlorosilane, trichloroethylsilane, tribromobenzylsilane and the like). Also preferred are the multihalogen-substituted hydrocarbons (such as, 1,3,5-tri(bromomethyl) benzene and 2,4,6,9-tetrachloro-3,7-decadiene) in which the halogen is attached to a carbon atom which is alpha to an activating group such as an ether linkage, a carbonyl group or a carbon-to-carbon double bond. Substituents inert with respect to lithium atoms in the terminally reactive polymer can also be present in the active halogen-containing compounds. Alternatively, other suitable reactive groups different from the halogen as described above can be present.

Examples of compounds containing more than one type of functional group include 1,3-dichloro-2-propanone, 2,2-dibromo-3-decanone, 3,5,5-trifluoro-4-octanone, 2,4-dibromo-3-pentanone, 1,2,4,5-diepoxy-3-pentanone, 1,2,4,5-diepoxy-3-hexanone, 1,2,11,12-diepoxy-8-pentadecanone, 1,3,18,19-diepoxy-7,14-eicosanedione and the like.

In addition to the silicon multihalides as described hereinabove, other metal multihalides, particularly those of tin, lead or germanium, also can be readily employed as coupling and branching agents. Difunctional counterparts of these agents also can be employed, whereby a linear polymer rather than a branched polymer results. Monofunctional counterparts can be used to end cap the rubbery polymer. For instance, trialkyl tin chlorides, such as tri-isobutyl tin chloride, can be utilized to end cap the rubbery polymer.

Broadly, and exemplary, a range of about 0.01 to 4.5 milliequivalents of coupling agent are employed per 100 grams of monomer. It is preferred to utilize about 0.01 to about 1.5 milliequivalents of the coupling agent per 100 grams of monomer to obtain the desired Mooney viscosity. The larger quantities tend to result in production of polymers containing terminally reactive groups or insufficient coupling. One equivalent of treating agent per equivalent of lithium is considered optimum amount for maximum branching, if this result is desired in the production line. The coupling agent can be added in hydrocarbon solution (e.g., in cyclohexane) to the polymerization admixture in the final reactor with suitable mixing for distribution and reaction.

After the copolymerization has been completed, the styrene-butadiene elastomer can be recovered from the organic solvent. The styrene-butadiene rubber can be recovered from the organic solvent and residue by means such as decantation, filtration, centrification and the like. It is often desirable to precipitate the segmented polymer from the organic solvent by the addition of lower alcohols containing from about 1 to about 4 carbon atoms to the polymer solution. Suitable lower alcohols for precipitation of the segmented polymer from the polymer cement include methanol, ethanol, isopropyl alcohol, normal-propyl alcohol and t-butyl alcohol. The utilization of lower alcohols to precipitate the rubber from the polymer cement also "kills" the living polymer by inactivating lithium end groups. After the segmented polymer is recovered from the solution, steam-stripping can be employed to reduce the level of volatile organic compounds in the rubber.

There are valuable benefits associated with utilizing the styrene-butadiene rubbers of this invention in making tire tread compounds. For instance, the styrene-butadiene rubber of this invention can be blended with natural rubber to make tread compounds for passenger tires which exhibit outstanding rolling resistance, traction and tread wear characteristics. In-cases where tread wear is of great importance, high cis-1,4-polybutadiene can also be included in the blend. In any case, the styrene-butadiene rubbers of this invention can be used to improve the traction, tread wear and rolling resistance of tires made therewith.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLES

The calcium-based catalyst of this invention can be used in the homopolymerization of 1,3-butadiene into polybutadiene (PBD), in the homopolymerization of isoprene into polyisoprene (PI), in the copolymerization of styrene and 1,3-butadiene into styrene-butadiene rubber (SBR) and in the terpolymerization of styrene, isoprene and 1,3-butadiene into styrene-isoprene-butadiene rubber (SIBR). The calcium-based catalyst system of this invention can be prepared in-situ or can be preformed.

Preparation of Solution SBR

A styrene/butadiene premix that contained 10 percent styrene and 90 percent 1,3-butadiene was charged in a one-gallon (3.785 liter) reactor equipped with a mechanical stirrer and under a blanket of nitrogen. Heat was applied to this reactor until the pre-mix temperature reached 75° C. At this point, catalyst was introduced. The catalyst included calcium tetrahydrofurfuryl alcohol (the calcium salt of tetrafydrofurfuryl alcohol which is hexane-soluble) which was introduced at a level of 1 mmole per 100 g of monomer. This was followed by the addition of 2 mmole of n-butyl lithium and 2 mmole of lithium t-butoxide, based on 100 g of monomer. It should be noted that the catalyst can be preformed or that the catalyst components can be added individually. The samples were taken at various time intervals and analyzed by gas chromatography (GC) analysis. The data showed that the 30/70 monomer composition in the pre-mix (monomer plus hexane) resulted in a copolymer having a constant composition of 30 percent styrene and 70 percent butadiene. Thus, a random copolymer was made throughout the polymerization. A monomer conversion of approximately 90 percent was reached after only one hour of polymerization time. The polymer was analyzed and was determined to have a glass transition temperature (Tg) of −54° C., a 20 percent bound 1,2-polybutadiene (vinyl) content and random styrene sequences. This polymerization with the calcium-based catalyst system offers the advantage of promoting a much faster rate of polymerization than can be attained utilizing barium based catalyst systems.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A process for synthesizing a random styrene-butadiene rubber having a high trans, low vinyl content by a process which comprises copolymerizing styrene and 1,3-butadiene in an organic solvent in the presence of a catalyst system which consists essentially of (a) an organolithium compound, (b) a calcium alkoxide and (c) a lithium alkoxide.

2. A process for synthesizing trans polybutadiene rubber having a vinyl content which is within the range of about 5 percent to about 20 percent by a process which comprises polymerizing 1,3-butadiene in an organic solvent in the presence of a catalyst system which consists essentially of (a) an organolithium compound, (b) a calcium alkoxide and (c) a lithium alkoxide.

3. A process for the synthesis of a random styrene-butadiene rubber as specified in claim 1 wherein from about 3 weight percent to about 50 weight percent styrene is copolymerized with about 50 weight percent to about 97 weight percent 1,3-butadiene.

4. A process for the synthesis of a random styrene-butadiene rubber as specified in claim 3 wherein said copolymerization is conducted at a temperature which is within the range of about 40° C. to about 120° C.

5. A process for the synthesis of a random styrene-butadiene rubber as specified in claim 4 wherein said organolithium compound is present in an amount which is within the range of about 0.01 phm to about 0.1 phm.

6. A process for the synthesis of a random styrene-butadiene rubber as specified in claim 5 wherein the molar ratio of the lithium alkoxide to the calcium alkoxide is within the range of about 2:1 to about 20:1; and wherein the molar ratio of the alkyl lithium compound to the calcium alkoxide is within the range of about 1:1 to about 6:1.

7. A process for the synthesis of a random styrene-butadiene rubber as specified in claim 6 wherein the calcium alkoxide is selected from the group consisting of calcium dimethoxide, calcium diethoxide, calcium diisopropoxide, calcium di-n-butoxide, calcium di-sec-butoxide, calcium di-t-butoxide, calcium di(1,1-dimethylpropoxide), calcium di(1,2-dimethyl-propoxide), calcium di(1,1-dimethylbutoxide), calcium di(1,10-dimethylpentoxide), calcium di(2-ethyl-hexanoxide), calcium di(1-methylheptoxide), calcium diphenoxide, calcium di(p-methylphenoxide), calcium di(p-octylphenoxide), calcium di(p-nonylphenoxide), calcium di(p-dodecylphenoxide), calcium di(α-naphthoxide), calcium di(β-naphthoxide), calcium (o-methoxyphenoxide), calcium (o-methoxyphenoxide), calcium di(m-methoxyphenoxide), calcium di(p-methoxy-phenoxide), calcium (o-ethoxyphenoxide) and calcium (4-methoxy-1-naphthoxide); wherein the organolithium compound is an organomonolithium compound; and wherein the lithium alkoxide is make by reacting an organolithium compound, metallic lithium or lithium hydride with an alcohol selected from the group consisting of methanol, ethanol, n-propyl alcohol, isopropyl alcohol, t-butanol, sec-butanol, cyclohexanol, octanol, 2-ethylhexanol, p-cresol, m-cresol, nonyl phenol, hexylphenol, tetrahydrofuryl alcohol, furfuryl alcohol, 3-tnethyltetrahydrofurfuryl alcohol, oligomer of tetrahydrofurfuryl alcohol, ethylene glycol monophenyl ether, ethylene glycol monobutyl ether, N,N-dimethylethanolamine, N,N-diethylethanolamine, N,N-dibutylethanolamine, N,N-diphenylethanolamine, N-methyldiethanolamine, N-ethyldiethanolamine, N-butyldiethanolamine, N-phenyldiethanolamine, N,N-dimethylpropanolamine, N,N-dibutylpropanolamine, N-methyldipropanolamine, N-ethyldipropanolamine, 1-(2-hydroxyethyl)pyrrolidine, 2-methyl-1(2-hydroxyethyl)pyrrolidine, 1-piperidineethanol, 2-phenyl-1-piperidineethanol, 2-ethyl-1-piperidinepropanol, N-β-hydroxyethylmorpholine, 2-ethyl-N-8-hydroxyethylmorpholine, 1-piperazineethanol, 1-piperazinepropanol, N,N'bis(β-hydroxyethyl)piperazine, N,N'-bis(Y-hydroxypropyl)-piperazine, 2-(β-hydroxyethyl)pyridine and 2-(γ-hydroxypropyl)pyridine.

8. A process for the synthesis of a random styrene-butadiene rubber as specified in claim 7 wherein the molar ratio of the lithium alkoxide to the calcium alkoxide is within the range of about 5:2 to about 10:1, and wherein the molar ratio of the alkyl lithium compound to the calcium alkoxide is within the range of about 3:2 to about 4:1.

9. A process for the synthesis of a random styrene-butadiene rubber as specified in claim wherein 8 the molar ratio of the lithium alkoxide to the calcium alkoxide is within the range of about 3:1 to about 5:1; wherein the molar ratio of the alkyl lithium compound to the calcium alkoxide is within the range of about 2:1 to about 3:1; wherein from about 15 weight percent to about 25 weight percent styrene is copolymerized with about 75 weight percent to about 85 weight percent 1,3-butadiene; and wherein said copolymerization is conducted at a temperature which is within the range of about 60° C. to about 85°.

10. A process for the synthesis of a random styrene-butadiene resin having a glass transition temperature which is within the range of about 7° C. to about 70° C. as specified in claimed 1 wherein from about 50 weight percent to about 95 weight percent styrene is copolymerized with about 5 weight percent to about 50 weight percent 1,3-butadiene.

11. A process as specified in claim 1 which further comprises terpolymerizing isoprene with said 1,3-butadiene and said styrene.

12. A process as specified in claim 1 which further comprises coupling the random styrene-butadiene rubber with tin tetrachloride.

13. A process as specified in claim 1 which further comprises coupling the random styrene-butadiene rubber with silicon tetrachloride.

14. A process as specified in claim 1 wherein said process is conducted in the presence of a polar modifier.

15. A process for synthesizing a random isoprene-butadiene rubber having a high trans, low vinyl content which comprises copolymerizing isoprene and 1,3-butadiene monomer in an organic solvent in the presence of a catalyst system which consists essentially of (a) an organolithium compound, (b) a calcium alkoxide and (c) a lithium alkoxide.

* * * * *